United States Patent
Suzuki et al.

(10) Patent No.: US 8,483,331 B2
(45) Date of Patent: Jul. 9, 2013

(54) RECEIVING DEVICE AND RADIO QUALITY CALCULATION METHOD

(75) Inventors: Mototsugu Suzuki, Yokosuka (JP); Tetsurou Imai, Yokosuka (JP); Koushirou Kitao, Yokohama (JP); Yoshihiro Ishikawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 306 days.

(21) Appl. No.: 12/996,785

(22) PCT Filed: Jun. 9, 2009

(86) PCT No.: PCT/JP2009/060503
§ 371 (c)(1),
(2), (4) Date: Feb. 17, 2011

(87) PCT Pub. No.: WO2009/151043
PCT Pub. Date: Dec. 17, 2009

(65) Prior Publication Data
US 2011/0188556 A1    Aug. 4, 2011

(30) Foreign Application Priority Data
Jun. 9, 2008  (JP) .................................. 2008-151076

(51) Int. Cl.
*H04L 27/06* (2006.01)

(52) U.S. Cl.
USPC .......................................................... 375/343

(58) Field of Classification Search
USPC ......................................... 375/224, 260, 343
See application file for complete search history.

(56) References Cited

U.S. PATENT DOCUMENTS

| | | | |
|---|---|---|---|
| 2005/0053038 A1 | 3/2005 | Kimura | |
| 2005/0250540 A1* | 11/2005 | Ishii et al. | 455/561 |
| 2006/0114812 A1* | 6/2006 | Kim et al. | 370/206 |
| 2008/0212700 A1* | 9/2008 | Han et al. | 375/260 |
| 2009/0060064 A1 | 3/2009 | Futaki et al. | |
| 2009/0147688 A1* | 6/2009 | Matsumoto et al. | 370/242 |
| 2009/0245214 A1* | 10/2009 | Mudulodu et al. | 370/338 |

FOREIGN PATENT DOCUMENTS

| | | |
|---|---|---|
| JP | 2005-86304 A | 3/2005 |
| JP | 2005-272460 A | 10/2005 |
| JP | 2006-129510 A | 5/2006 |
| JP | 2006-191583 A | 7/2006 |
| WO | 2006/107037 A1 | 10/2006 |
| WO | 2009/005054 A1 | 1/2009 |

OTHER PUBLICATIONS

International Search Report issued in PCT/JP2009/060503, mailed on Aug. 18, 2009, with translation, 3 pages.
Written Opinion issued in PCT/JP2009/060503, mailed on Aug. 18, 2009, 4 pages.
Office Action in corresponding Chinese Application No. 200980121077.1 dated Mar. 6, 2013 (9pages).

* cited by examiner

*Primary Examiner* — Don N Vo
(74) *Attorney, Agent, or Firm* — Osha Liang LLP

(57) ABSTRACT

A reception device calculates a radio quality in a downlink by using a plurality of pilot symbols transmitted from a base station. The reception device includes a correlation calculation unit and a radio quality calculation unit. The correlation calculation unit calculates a correlation value between a first pilot symbol and a second pilot symbol on a time axis or a correlation value there between on a frequency axis. If the correlation value obtained by the correlation calculation unit exceeds a predetermined threshold value, the radio quality calculation unit calculates a radio quality in the downlink by using a reception quality of the first pilot symbol and a reception quality of the second pilot symbol.

11 Claims, 8 Drawing Sheets

☒ : Reference Signal (CORRESPONDING TO CPICH SIGNAL IN W-CDMA)

☒ : Reference Signal (CORRESPONDING TO CPICH SIGNAL IN W-CDMA)

RECEIVING DEVICE AND RADIO QUALITY CALCULATION METHOD

TECHNICAL FIELD

The present invention relates to a receiving device configured to calculate a downlink radio quality by use of multiple pilot symbols transmitted from a base station, and to a radio quality calculation method.

BACKGROUND ART

In a W-CDMA (Wideband-Code Division Multiple Access) mobile communication system, a receiving device (mobile station, for example) is configured to perform despreading processing on a W-CDMA signal transmitted from a base station, as shown in FIG. 10, and to calculate a downlink radio quality by use of a CPICH (Common Pilot Channel) signal thus acquired.

In the W-CDMA mobile communication system, for example, the receiving device is configured to calculate a downlink radio quality by performing averaging processing by use of (Formula 1) below, on receiving qualities $r_n$ and $r_{n+1}$ of two pilot symbols $s_n$ and $s_{n+1}$ which are transmitted consecutively in a time axis direction.

[Numerical Expression 1]

$$\lambda_1 = 1/2N_s \times \sum_{1}^{Ns} |r_n + r_{n+1}|^2$$

$$\lambda_2 = 1/2N_s \times \sum_{1}^{Ns} |r_n - r_{n+1}|^2$$

$$RSRP = 1/2 \times |\lambda_1 - \lambda_2|$$

$$ISSI = \lambda_2$$

(Formula 1)

Herein, "RSRP" denotes a reception power of a required signal, and "ISSI" denotes a received power of an interference signal. In addition, "$r_n = \alpha S_n + I_n$" and "$r_{n+1} = \beta S_{n+1} + I_{n+1}$" hold true, where each of "$\alpha$" and "$\beta$" denotes an amplitude shift and a phase shift which arise due to a fading effect on the corresponding one of the transmitted symbols, and each of "$I_n$" and "$I_{n+1}$" denotes an interference wave component including thermal noise of the corresponding symbol.

In this regard, in the W-CDMA mobile communication system, two pilot symbols transmitted consecutively on a time axis at a single frequency are used for calculation of the downlink radio quality. In a case where transmission channels of these two pilot symbols can be regarded as almost the same transmission channel, the coefficients "$\alpha$" and "$\beta$" by which "$s_n$" and "$s_{n+1}$" are respectively multiplied are regarded as the same. Thereby, highly accurate estimation of a power is possible in this case.

SUMMARY OF INVENTION

Technical Problems

In contrast, a LTE (Long Term Evolution) mobile communication system is configured to transmit multiple pilot symbols inconsecutively on both a frequency axis and a time axis, as shown in FIG. 11.

For this reason, fading effects on the pilot symbols are highly likely to differ from one another in the LTE mobile communication system. This brings about a problem that highly accurate calculation of a downlink radio quality by use of multiple pilot symbols cannot be performed with the same calculation method as the one used in the W-CDMA mobile communication system.

The present invention is made in view of the above problem, and an object of the present invention is to provide a receiving device and a radio quality calculation method which are capable of calculating a downlink radio quality highly accurately by use of multiple pilot symbols transmitted inconsecutively on both a frequency axis and a time axis.

A first aspect of the present invention is summarized as a receiving device configured to calculate a downlink radio quality by use of a plurality of pilot symbols transmitted from a base station, the receiving device comprise a correlation calculation unit configured to calculate at least one of a time axis correlation value and a frequency axis correlation value between a first pilot symbol and a second pilot symbol, and a radio quality calculation unit configured to calculate the downlink radio quality by use of a receiving quality of the first pilot symbol and a receiving quality of the second pilot symbol only in a case where the correlation value calculated by the correlation calculation unit exceeds a predetermined threshold.

In the first aspect, wherein the correlation calculation unit is configured to calculate the time axis correlation value by use of a vehicle speed pulse.

In the first aspect, wherein the correlation calculation unit is configured to calculate the time axis correlation value by use of an estimated travelling speed of a mobile terminal.

In the first aspect, wherein the correlation calculation unit is configured to calculate the frequency axis correlation value by use of a delay profile of a synchronization channel signal.

In the first aspect, wherein the radio quality calculation unit is configured to verify whether or not the correlation value exceeds a predetermined threshold, with reference to the correlation value managed by the managing unit.

In the first aspect, wherein the correlation calculation unit is configured to calculate the correlation value after the receiving device become synchronized with the base station on the basis of a synchronization channel signal.

A second aspect of the present invention is summarized as a radio quality calculation method with which a receiving device calculates a downlink radio quality by use of a plurality of pilot symbols transmitted from a base station, the method comprising the steps of calculating, at the receiving device, at least one of a time axis correlation value and a frequency axis correlation value between a first pilot symbol and a second pilot symbol, and calculating, at the receiving device, the downlink radio quality by use of a receiving quality of the first pilot symbol and a receiving quality of the second pilot symbol in a case where the correlation value thus calculated exceeds a predetermined threshold.

As described above, according to the present invention, it is possible to provide a receiving device and a radio quality calculation method which are capable of calculating a downlink radio quality highly accurately by use of multiple pilot symbols transmitted inconsecutively on both a frequency axis and a time axis.

DESCRIPTION OF EMBODIMENT (Configuration of Mobile Communication System According to First Embodiment of the Present Invention)

A configuration of a mobile communication system according to a first embodiment of the present invention will be described with reference to FIG. 1 and FIG. 2.

Figure 1:
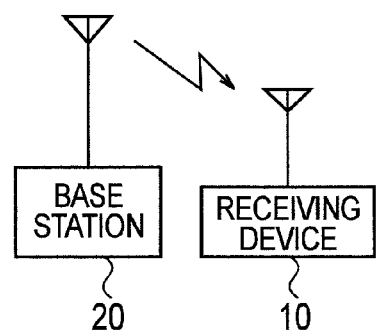
FIG. 1 is an overall configurational view of a mobile communication system according to a first embodiment of the present invention.

As shown in FIG. 1, in the mobile communication system according to the present embodiment, a receiving device 10 (mobile station, for example) is configured to calculate a downlink radio quality by use of multiple pilot symbols transmitted from a base station 20.

Figure 2:
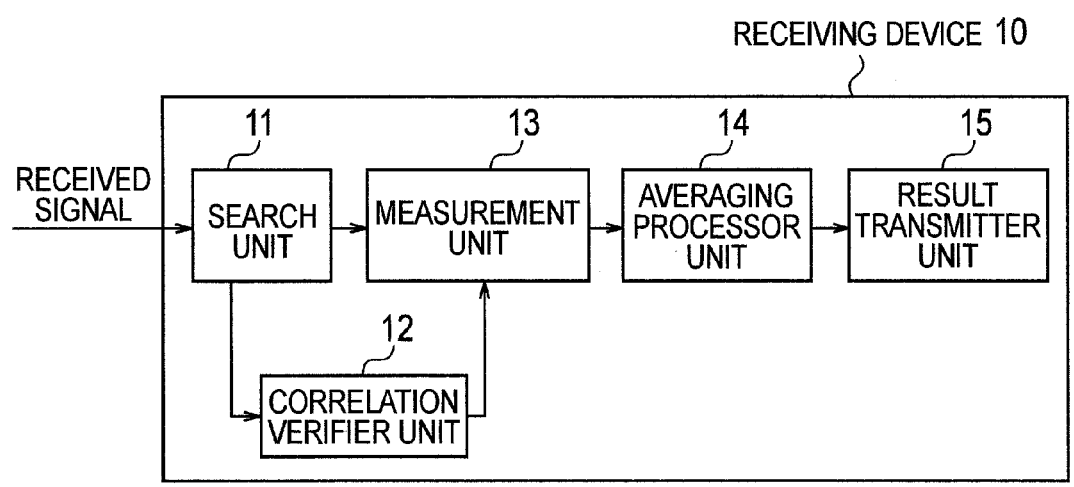
FIG. 2 is a functional block diagram of a receiving device according to the first embodiment of the present invention.

As shown in FIG. 2, the receiving device 10 includes a search unit 11, a correlation verifier unit 12, a measurement unit 13, an averaging processor unit 14, and a result transmitter unit 15.

The search unit 11 is configured to perform searching by use of an SCH signal transmitted from each of base stations and to synchronize the receiving device 10 with the base station on the basis of the SCH signal.

The correlation verifier unit 12 is configured to calculate at least one of a time axis correlation value and a frequency axis correlation value between two "RSs (Reference signals, or pilot symbols)" transmitted from the base station 20 after the receiving device 10 become synchronized with the base station 20 on the basis of the SCH (synchronization channel) signal.

Specifically, the correlation verifier unit 12 may be configured to calculate a frequency axis correlation value between two RSs (pilot symbols) by use of a delay profile of a SCH (synchronous channel) signal.

Moreover, the correlation verifier unit 12 may be configured to calculate a time axis correlation value between two RSs (pilot symbols) by use of a vehicle speed pulse.

In this respect, the correlation verifier unit 12 may be configured to manage, as a table in advance, at least one of time axis correlation values and frequency axis correlation values for a predetermined area.

The measurement unit 13 is configured to measure receiving qualities (reception powers and the like, for example) of the two pilot symbols in the case where the correlation value calculated by the correlation verifier unit 12 exceeds a predetermined threshold.

Alternatively, the measurement unit 13 may be configured to verify with reference to the correlation values managed by the correlation verifier unit 12 whether or not the correlation value thus calculated exceeds a predetermined threshold.

The averaging processor unit 14 is configured to calculate a downlink radio quality by use of the receiving qualities of the two pilot symbols measured by the measurement unit 13.

The result transmitter unit 15 is configured to notify a user of a calculation result obtained by the averaging processor unit 14.

(Operation of Mobile Communication System According to First Embodiment of the Present Invention)

An operation of the receiving device 10 in the mobile communication system according to the first embodiment of the present invention will be described with reference to FIG. 3 to FIG. 8.

Firstly, with reference to FIG. 3 to FIG. 5, a description will be given of a calculation method of a downlink radio quality in the mobile communication system according to the first embodiment of the present invention by use of a frequency axis correlation value between a first RS "S1" and a second RS "S2."

Figure 3:
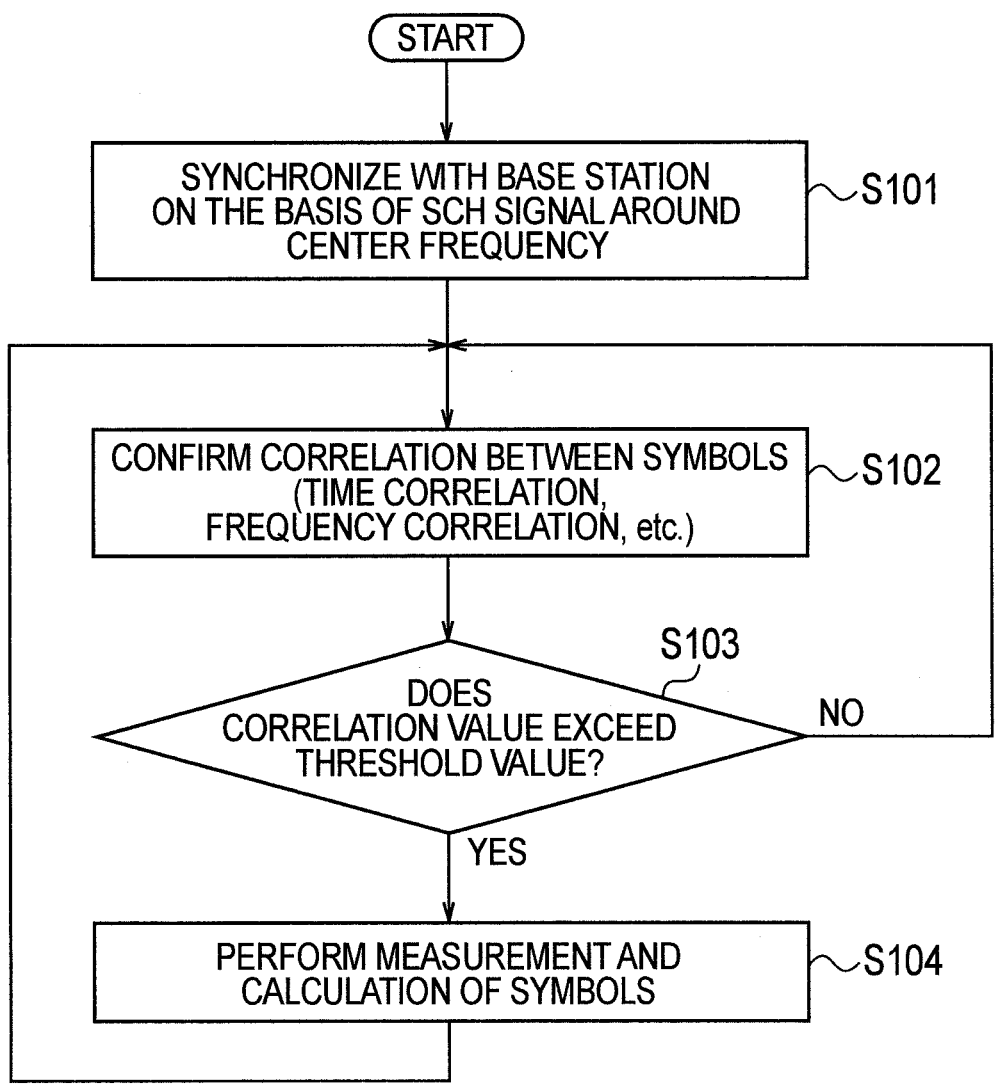
FIG. 3 is a flowchart for illustrating an operation of the mobile communication system according to the first embodiment of the present invention.

As shown in FIG. 3, in Step S101, the search unit 11 of the receiving device 10 synchronizes the receiving device 10 itself with the base station 20 on the basis of an SCH signal around the center frequency in a carrier frequency, the SCH signal being transmitted from the base station 20.

Figure 4:
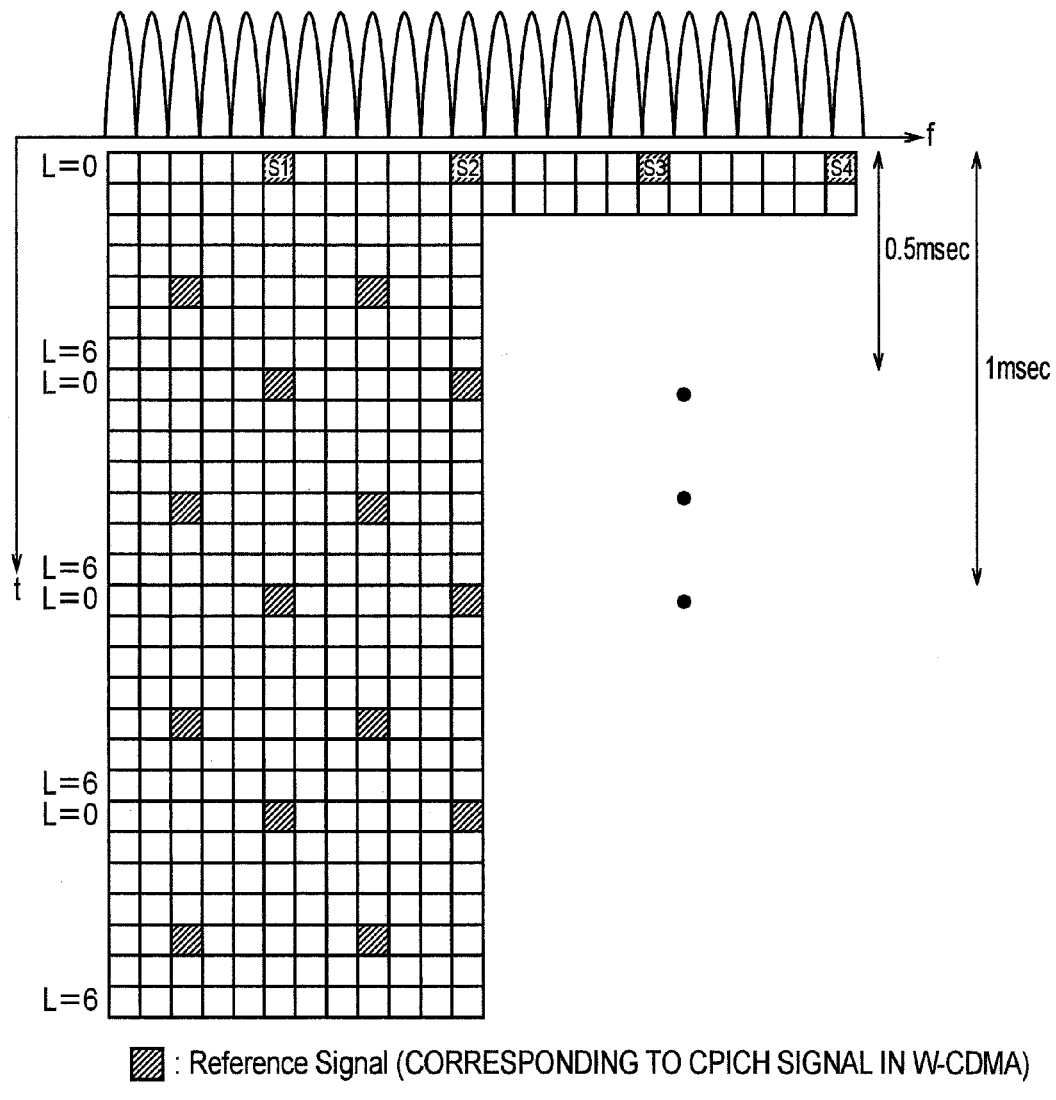
FIG. 4 is a diagram for illustrating a correlation verification method performed by the receiving device according to the first embodiment of the present invention.

In Step S102, the correlation verifier unit 12 of the receiving device 10 calculates a correlation value (frequency axis correlation value) between a first RS (first pilot symbol) "S1" and a second RS (second pilot symbol) "S2" which are transmitted at the same timing, as shown in FIG. 4.

For example, the correlation verifier unit 12 calculates a correlation value between "S1" and "S2" by use of (Formula 2) below.

[Numerical Expression 2]

$$P(\Omega) = \frac{1}{\left(1 + j2\pi\Omega\left(\frac{\Delta l}{C}\right)\right)e^{j2\pi\frac{lo}{C}}} \quad \text{(Formula 2)}$$

Herein, "Ω" denotes a difference between a frequency f (S1) on which the first RS "S1" is transmitted and a RS frequency f(S2) on which the second RS "S2" is transmitted, "Δl/c" denotes expansion of transmission delay time between f(S1) and f(S2) which are acquired from the delay profile described above, and "lo" denotes the shortest length of a transmission channel between the base station 20 and the receiving device 10.

Figure 5:
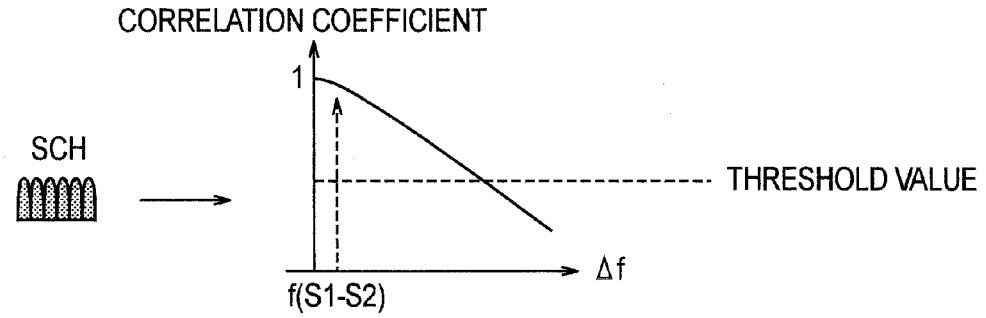
FIG. 5 is a diagram for illustrating a correlation calculation method performed by the receiving device according to the first embodiment of the present invention.

The correlation verifier unit 12 of the receiving device 10 is configured to verify in Step S103 whether or not the frequency axis correlation value between "S1" and "S2" exceeds a predetermined threshold, as shown in FIG. 5.

In this respect, the correlation verifier unit 12 may be configured to manage frequency axis correlation values for a predetermined area (urban area, suburb, or the like, for example) and to verify with reference to the frequency axis correlation values whether or not the frequency axis correlation value between "S1" and "S2" exceeds a predetermined threshold.

When the correlation verifier unit 12 verifies that the frequency axis correlation value exceeds the predetermined threshold, the measurement unit 13 of the receiving device 10 measures a receiving quality $r_n$ of the first RS "S1" and a receiving quality $r_{n+1}$ of the second RS "S2" in Step S104. The averaging processor unit 14 of the receiving device 10 then calculates a downlink radio quality by performing averaging processing on the receiving quality $r_n$ of the first RS "S1" and the receiving quality $r_{n+1}$ of the second RS "S2" by use of (Formula 1) below.

[Numerical Expression 3]

$$\lambda_1 = 1/2N_s \times \sum_1^{Ns} |r_n + r_{n+1}|^2$$

$$\lambda_2 = 1/2N_s \times \sum_1^{Ns} |r_n - r_{n+1}|^2$$

$$RSRP = 1/2 \times |\lambda_1 - \lambda_2|$$

$$ISSI = \lambda_2$$

(Formula 1)

Note that the downlink radio quality can be calculated in the same manner by use of a frequency axis correlation value between a first RS "S2" and a second RS "S3" or by use of a frequency axis correlation value between a first RS "S3" and a second RS "S4."

Secondly, with reference to FIG. 3, FIG. 6, and FIG. 7, a description will be given of a calculation method of a downlink radio quality in the mobile communication system according to the first embodiment of the present invention by use of a time axis correlation value between a first RS "S1" and a second RS "S5."

As shown in FIG. 3, in Step S101, the search unit 11 of the receiving device 10 synchronizes the receiving device 10 itself with the base station 20 on the basis of a SCH signal around the center frequency in a carrier frequency, the SCH signal being transmitted from the base station 20.

Figure 6:
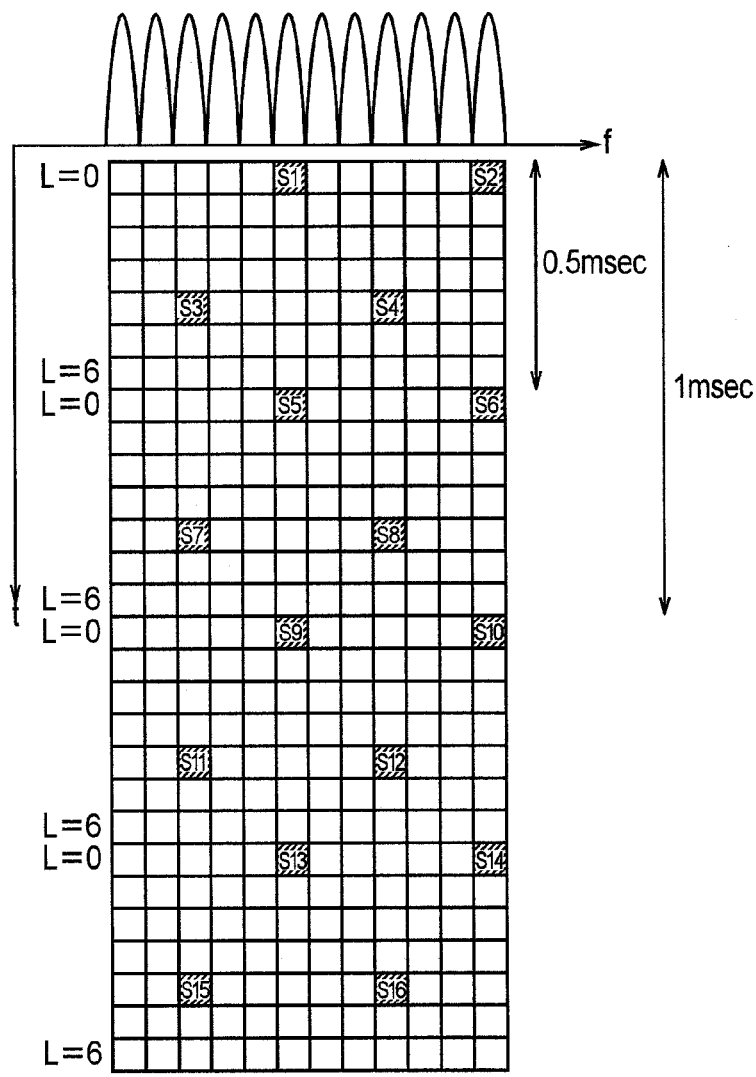
FIG. 6 is a diagram for illustrating a correlation verification method performed by the receiving device according to the first embodiment of the present invention.

In Step S102, the correlation verifier unit 12 of the receiving device 10 calculates a correlation value (time axis correlation value) between a first RS (first pilot symbol) "S1" and a second RS (second pilot symbol) "S5" which are transmitted on the same frequency, as shown in FIG. 6.

For example, the correlation verifier unit 12 verifies a correlation value between "S1" and "S5" by use of (Formula 3) below.

[Numerical Expression 4]

$$\rho(\tau) = J0(2\pi \times fD \times \tau)$$

(Formula 3)

Herein, "τ" denotes a difference between a timing t(S1) at which the first RS "S1" is transmitted and a timing t(S5) at which the second RS "S5" is transmitted, and "fD" denotes the maximum Doppler frequency between t (S1) and t (S5) in a case where the receiving device is disposed on a measurement vehicle, t(S1) and t(S5) being acquired from the vehicle speed pulse as described above.

In this respect, in a case where the vehicle speed pulse is not used, "fD" can be calculated by estimating the travelling speed from the measured delay profile. In a case where the receiving device is disposed on a mobile terminal, a method is employed in which "fD" is calculated from the delay profile. Meanwhile, "J( )" denotes Bessel functions of the first kind.

Figure 7:
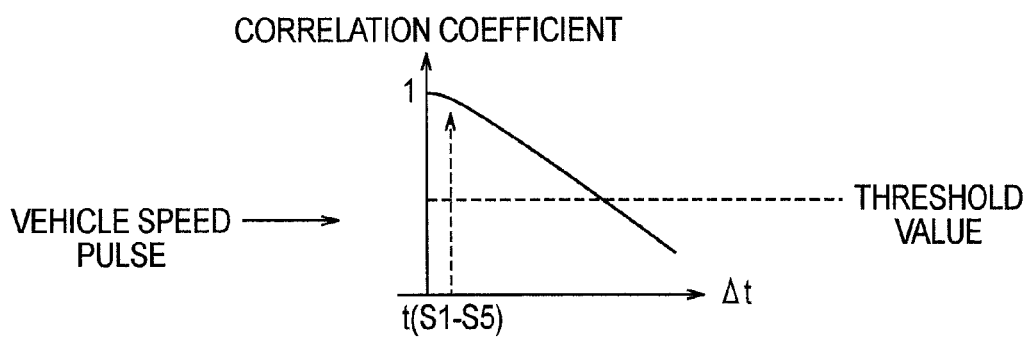
FIG. 7 is a diagram for illustrating a correlation calculation method performed by the receiving device according to the first embodiment of the present invention.

The correlation verifier unit 12 verifies in Step S103 whether or not the time axis correlation value between "S1" and "S5" exceeds a predetermined threshold, as shown in FIG. 7.

In this respect, the correlation verifier unit 12 may be configured to manage time axis correlation values for a predetermined area (urban area, suburb, or the like, for example) and to verify with reference to the time axis correlation values whether or not the time axis correlation value between "S1" and "S5" exceeds a predetermined threshold.

When the correlation verifier unit 12 verifies that the time axis correlation value exceeds the predetermined threshold, the measurement unit 13 of the receiving device 10 measures a receiving quality $r_n$ of the first RS "S1" and a receiving quality $r_{n+1}$ of the second RS "S5" in Step S104. The averaging processor unit 14 of the receiving device 10 then calculates a downlink radio quality by performing averaging processing on the receiving quality $r_n$ of the first RS "S1" and the receiving quality $r_{n+1}$ of the second RS "S5" by use of (Formula 1) as described above.

Note that the downlink radio quality can be calculated in the same manner by use of a time axis correlation value between a first RS "S2" and a second RS "S6" or by use of a time axis correlation value between a first RS "S3" and a second RS "S7."

Thirdly, with reference to FIG. 3 and FIG. 8, a description will be given of a calculation method of a downlink radio quality in the mobile communication system according to the first embodiment of the present invention by use of a correlation value between a first RS "S1" and nearby RSs surrounding the first RS "P2."

As shown in FIG. 3, in Step S101, the search unit 11 of the receiving device 10 synchronizes the receiving device 10 itself with the base station 20 on the basis of an SCH signal around the center frequency in a carrier frequency, the SCH signal being transmitted from the base station 20.

Figure 8:
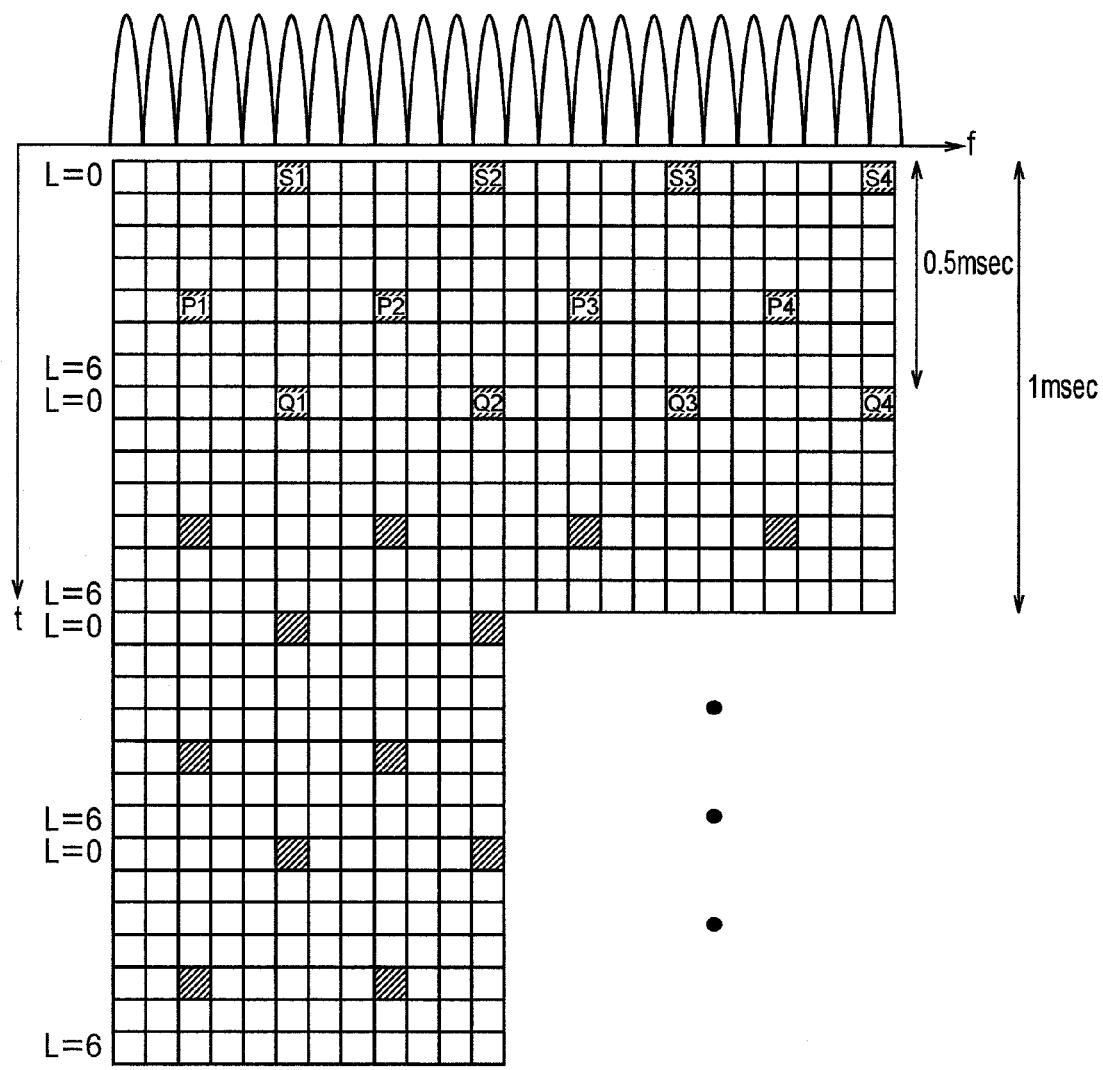
FIG. 8 is a diagram for illustrating a correlation verification method performed by the receiving device according to the first embodiment of the present invention.

In Step S102, as shown in FIG. 8, the correlation verifier unit 12 of the receiving device 10 calculates a correlation value between a first RS "P2" and each of nearby RSs "S1," "S2," "P1," "P3," "Q1," and "Q2," which surround "P2."

Specifically, the correlation verifier unit 12 firstly calculates each of frequency axis correlation values X1 to X6 between "P2" and the corresponding one of "S1," "S2," "P1," "P3," "Q1," and "Q2."

Secondly, the correlation verifier unit 12 calculates each of time axis correlation values Y1 to Y6 between "P2" and the corresponding one of "S1," "S2," "P1," "P3," "Q1," and "Q2."

Thirdly, the correlation verifier unit 12 multiplies the frequency axis correlation values X1 to X6 by the respective time axis correlation values Y1 to Y6, and sets the products as correlation values Z1 to Z6 between "P2" and the respective RSs "S1," "S2," "P1," "P3," "Q1," and "Q2."

In Step S103, the correlation verifier unit 12 selects the maximum value exceeding a predetermined threshold among the correlation values Z1 to Z6.

In accordance with the selected one of the correlation values Z1 to Z6, the measurement unit 13 of the receiving device 10 measures a receiving quality $r_n$ of the first RS "P2" and receiving qualities $r_{n+1}$ of second RSs "S1," "S2," "P1," "P3," "Q1," and "Q2," in Step S104. The averaging processor unit 14 of the receiving device 10 then calculates a downlink radio quality by performing averaging processing on the receiving quality $r_n$ of the first RS "P2" and the receiving qualities $r_{n+1}$ of the second RSs "S1," "S2," "P1," "P3," "Q1," and "Q2," by use of (Formula 1) as described above.

(Advantageous Effect of Mobile Communication System According to First Embodiment of the Present Invention)

The mobile communication system according to the first embodiment of the present invention uses only two RSs (pilot symbols), a frequency axis correlation value or a time axis correlation value between which exceeds a predetermined threshold. Thus, the mobile communication system according to the first embodiment of the present invention is capable of calculating a downlink radio quality highly accurately.

(Modified Example of First Embodiment of the Present Invention)

In the first embodiment, the description has been given of the calculation method of the correlation value by use of "RSs." In contrast, in the present modified example, a correlation value may be calculated by use of "SCH (synchronization channel) signals."

In addition, the correlation verifier unit 12 of the receiving device may calculate a correlation value r between "X" and "Y" by use of (Formula 4) below, instead of using (Formula 2) or (Formula 3).

[Numerical Expression 5]

$$r = C/(\delta x \times \delta y)$$

$$C = E(X - X\_\text{ave})E(Y - Y\_\text{ave}) \quad \text{(Formula 4)}$$

Herein, each of "X" and "Y" is a set of a collection of a predetermined number of pilot symbols. Specifically, each of "X" and "Y" may be a set of pilot symbols on a single frequency axis, may be a set of pilot symbols on a single time axis, may be a set of pilot symbols on different frequency axes, and may be a set of pilot symbols on different time axes.

In addition, "$X_{\_ave}$" is a mean value of "X," "$\delta_x$" is a standard deviation of "X," "$Y_{\_ave}$" is a mean value of "Y," and "$\delta_y$" is a standard deviation of "Y."

Note that "X" and "Y" may have a correlation between each other on a frequency axis, or may have a correlation between each other on a time axis.

Figure 9:
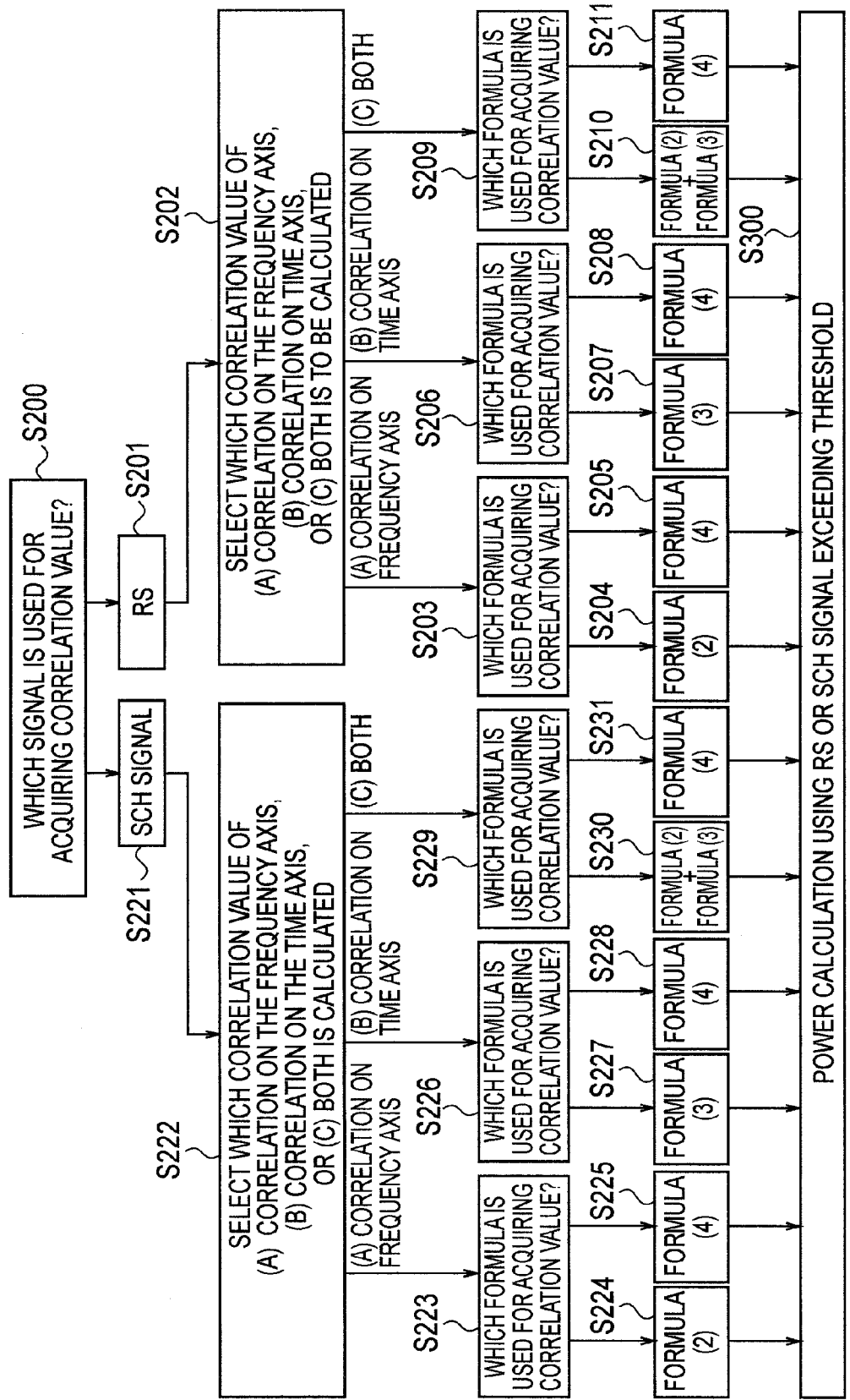
FIG. 9 is a flowchart for illustrating an operation of a mobile communication system according to a modified example of the first embodiment of the present invention.
Figure 10:
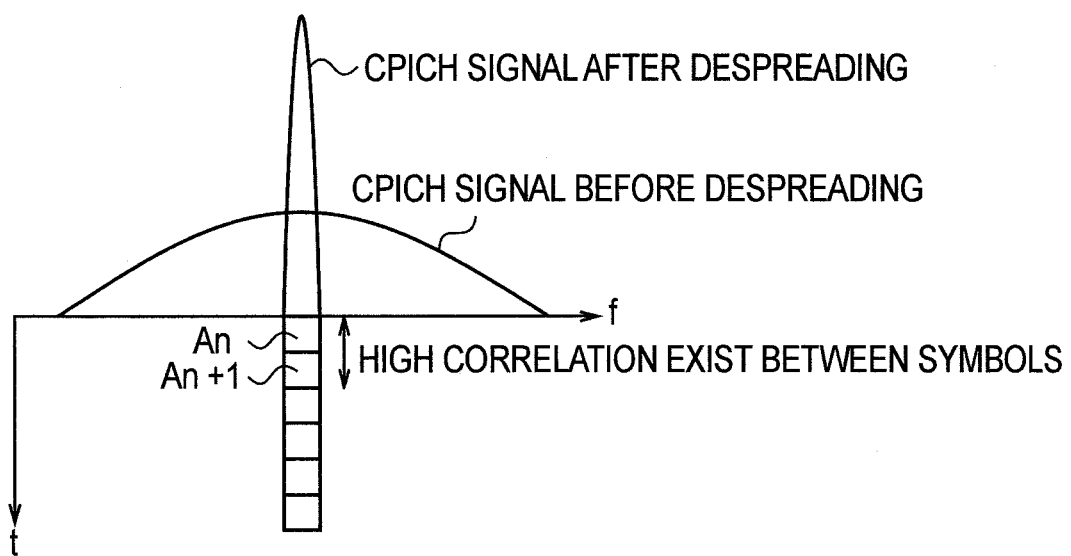
FIG. 10 is a diagram for illustrating a method for calculating an average value of measured values of pilot signals in the conventional W-CDMA mobile communication system.
Figure 11:
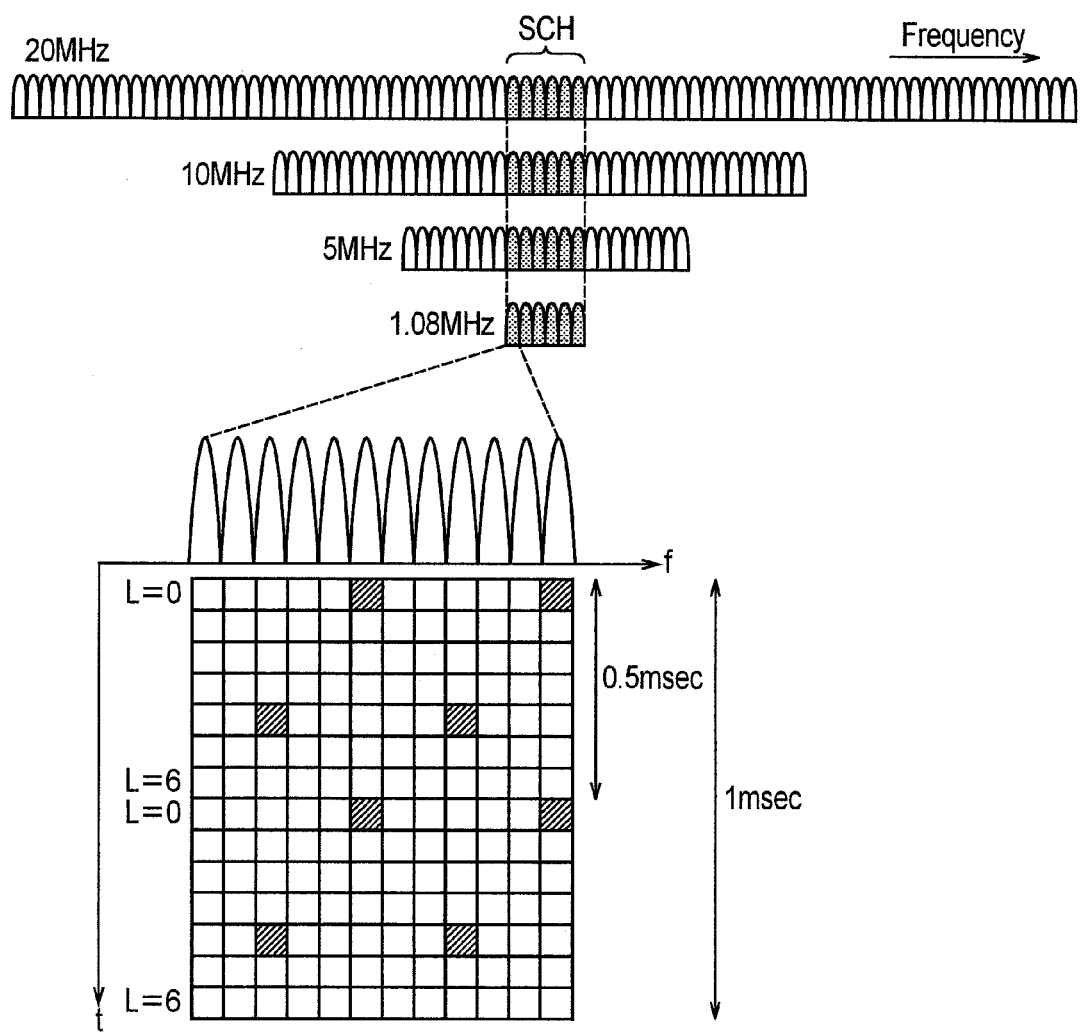
FIG. 11 is a diagram for illustrating a transmission method of pilot signals in the LTE mobile communication system.

According to the present modified example, a receiving device 10 may select a channel for calculating a correlation value and selectively use formulae for calculating the correlation value An operation of the receiving device 10 according to the present modified example will be described with reference to FIG. 9.

In Step S200, the receiving device 10 selects a signal to be used for acquiring a correlation value.

The receiving device 10 is capable of selectively using "RS" and "SCH" as signals to be used for acquiring a correlation value on the basis of criteria such as that "RS" should be selected in a case where the correlation value has to be acquired in short time.

When the receiving device 10 selects "RS" in Step S201 as a signal to be used for acquiring the correlation value, the receiving device 10 then determines in Step S202 whether to calculate the correlation value by use of "(A) a correlation on the frequency axis", whether to calculate the correlation value by use of "(B) a correlation on the time axis", and whether to calculate the correlation value by use of "(C) both correlations on the frequency axis and on the time axis."

When the receiving device 10 has determined to calculate the correlation value by use of "(A) the correlation on the frequency axis," the receiving device 10 then selects a formula for calculating the correlation value in Step S203.

In Step S204 or S205, the receiving device 10 calculates the correlation value by use of (Formula 2) or (Formula 4) which is selected in Step S203.

In Step S300, the receiving device 10 selects at least two RSs with a correlation value exceeding a threshold among the correlation values thus calculated, and calculates a power by use of the selected RSs.

Meanwhile, when the receiving device 10 has determined to calculate the correlation value by use of "(B) the correlation on the time axis," the receiving device 10 selects a formula for calculating the correlation value in Step S206.

In Step S207 or S208, the receiving device 10 calculates the correlation value by use of (Formula 3) or (Formula 4) which is selected in Step S206.

In Step S300, the receiving device 10 selects at least two RSs with a correlation value exceeding a threshold among the correlation values thus calculated, and calculates a power by use of the selected RSs.

Meanwhile, when the receiving device 10 has determined to calculate the correlation value by use of "(C) both the correlations on the frequency axis and on the time axis," the receiving device 10 selects a formula for calculating the correlation value in Step S209.

In Step S210 or S211, the receiving device 10 calculates the correlation value by use of (Formula 4) or a combination of (Formula 2) and (Formula 3) which is selected in Step S209.

In Step S300, the receiving device 10 selects at least two RSs with a correlation value exceeding a threshold among the correlation values thus calculated, and calculates a power by use of the selected RSs.

When the receiving device 10 selects "SCH signal" in Step S221 as signal to be used for acquiring the correlation value, the receiving device 10 then determines in Step S222 whether to calculate the correlation value by use of "(A) a correlation on the frequency axis", whether to calculate the correlation value by use of "(B) a correlation on the time axis", and whether to calculate the correlation value by use of "(C) both correlations on the frequency axis and on the time axis."

When the receiving device 10 has determined to calculate the correlation value by use of "(A) the correlation on the frequency axis," the receiving device 10 then selects a formula for calculating the correlation value in Step S223.

In Step S224 or S225, the receiving device 10 calculates the correlation value by use of (Formula 2) or (Formula 4) which is selected in Step S223.

In Step S300, the receiving device 10 selects at least two SCH signals (symbols) with a correlation value exceeding a threshold among the correlation values thus calculated, and calculates a power by use of the selected SCH signals.

Meanwhile, when the receiving device 10 has determined to calculate the correlation value by use of "(B) the correlation on the time axis," the receiving device 10 selects a formula for calculating the correlation value in Step S226.

In Step S227 or S228, the receiving device 10 calculates the correlation value by use of (Formula 3) or (Formula 4) which is selected in Step S226.

In Step S300, the receiving device 10 selects at least two SCH signals (symbols) with a correlation value exceeding a threshold among the correlation values thus calculated, and calculates a power by use of the selected SCH signals.

Meanwhile, when the receiving device 10 has determined to calculate the correlation value by use of "(C) both the correlations on the frequency axis and on the time axis," the receiving device 10 selects a formula for calculating the correlation value in Step S229.

In Step S230 or S231, the receiving device 10 calculates the correlation value by use of (Formula 4) or a combination of (Formula 2) and (Formula 3) which is selected in Step S229.

In Step S300, the receiving device 10 selects at least two SCH signals with a correlation value exceeding a threshold among the correlation values thus calculated, and calculates a power by use of the selected SCH signals.

Note that operation of the above described, the receiving device 10 and the base station 20 may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the receiving device 10 and the base station 20. Also, the storage medium and the processor may be provided in the receiving device 10 and the base station 20 as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A receiving device configured to calculate a downlink radio quality by use of a plurality of pilot symbols transmitted from a base station, the receiving device comprising:
    a correlation calculation unit configured to calculate at least one of a time axis correlation value and a frequency axis correlation value between a first pilot symbol and a second pilot symbol; and
    a radio quality calculation unit configured to calculate the downlink radio quality by use of a receiving quality of the first pilot symbol and a receiving quality of the second pilot symbol only in a case where the correlation value calculated by the correlation calculation unit exceeds a predetermined threshold.

2. The receiving device according to claim 1, wherein the correlation calculation unit is configured to calculate the time axis correlation value by use of a vehicle speed pulse.

3. The receiving device according to claim 2, wherein the correlation calculation unit is configured to calculate the correlation value after the receiving device become synchronized with the base station on the basis of a synchronization channel signal.

4. The receiving device according to claim 1, wherein the correlation calculation unit is configured to calculate the time axis correlation value by use of an estimated travelling speed of a mobile terminal.

5. The receiving device according to claim 4, wherein the correlation calculation unit is configured to calculate the correlation value after the receiving device become synchronized with the base station on the basis of a synchronization channel signal.

6. The receiving device according to claim 1, wherein the correlation calculation unit is configured to calculate the frequency axis correlation value by use of a delay profile of a synchronization channel signal.

7. The receiving device according to claim 6, wherein the correlation calculation unit is configured to calculate the correlation value after the receiving device become synchronized with the base station on the basis of a synchronization channel signal.

8. The receiving device according to claim 1 comprising
    a managing unit configured to manage at least one of a time axis correlation value and a frequency axis correlation value for a predetermined area, wherein
    the radio quality calculation unit is configured to verify whether or not the correlation value exceeds a predetermined threshold, with reference to the correlation value managed by the managing unit.

9. The receiving device according to claim 8, wherein the correlation calculation unit is configured to calculate the correlation value after the receiving device become synchronized with the base station on the basis of a synchronization channel signal.

10. The receiving device according to claim 1, wherein the correlation calculation unit is configured to calculate the correlation value after the receiving device become synchronized with the base station on the basis of a synchronization channel signal.

11. A radio quality calculation method with which a receiving device calculates a downlink radio quality by use of a plurality of pilot symbols transmitted from a base station, the method comprising the steps of:
    calculating, at the receiving device, at least one of a time axis correlation value and a frequency axis correlation value between a first pilot symbol and a second pilot symbol, and
    calculating, at the receiving device, the downlink radio quality by use of a receiving quality of the first pilot symbol and a receiving quality of the second pilot symbol in a case where the correlation value thus calculated exceeds a predetermined threshold.

* * * * *